United States Patent [19]

Ohara et al.

[11] Patent Number: 4,607,687
[45] Date of Patent: Aug. 26, 1986

[54] HEAT STORAGE DEVICE

[75] Inventors: Shumpei Ohara; Noriyasu Sagara; Hiroo Izumiyama; Yoshinobu Arai, all of Tokyo, Japan

[73] Assignee: Kajima Keneetus Kabushiki Kaisha, Tokyo, Japan

[21] Appl. No.: 656,511

[22] Filed: Oct. 1, 1984

[30] Foreign Application Priority Data

Oct. 4, 1983 [JP] Japan .................. 58-185510

[51] Int. Cl.[4] .................. F28D 21/00; F24J 3/02
[52] U.S. Cl. .................. 165/104.19; 137/592; 126/437
[58] Field of Search .................. 165/104.19; 137/592; 126/437

[56] References Cited

U.S. PATENT DOCUMENTS 1,247,905 11/1917 Troost .......................... 165/104.19

FOREIGN PATENT DOCUMENTS

| 49 | 1/1977 | Japan | 165/104.19 |
| 160534 | 12/1981 | Japan | 126/437 |
| 172144 | 10/1982 | Japan | 165/104.19 |
| 830084 | 5/1981 | U.S.S.R. | 126/437 |
| 857657 | 8/1981 | U.S.S.R. | 165/104.19 |
| 898225 | 1/1982 | U.S.S.R. | 165/104.19 |

Primary Examiner—Albert W. Davis, Jr.
Attorney, Agent, or Firm—Pearne, Gordon, Sessions, McCoy, Granger, Tilberry

[57] ABSTRACT

A heat storage tank is provided to receive a spent liquid from a heat transfer mechanism, to reconstitute the liquid and to return the reconstituted liquid to the heat transfer mechanism for another heat transfer cycle. The tank is divided into at least two compartments. Spent liquid is discharged into a first compartment near its lower portion. Means are provided for passing liquid from the first compartment to a second compartment by drawing liquid from the upper portion of the first compartment and discharging it near the lower portion of the second compartment. The liquid is then drawn from the upper portion of the second compartment and returned to the heat transfer mechanism.

1 Claim, 4 Drawing Figures

PRIOR ART

HEAT STORAGE DEVICE

BACKGROUND OF THE INVENTION

1. Field of the Invention

This invention relates to a heat storage device for storing a heat transfer medium, such as water, for air conditioning of a building structure or the like.

2. Description of the Prior Art

As a prior art heat storage device which is said to provide an excellent constant temperature layer and have a satisfactory heat efficiency, there is an "overflow weir/underflow weir" type heat storage tank. This type of tank, as shown in FIG. 4, is partitioned by wall 1 into sub-tanks 2a and 2b. Sub-tank 2a is provided with an overflow weir 3 open to the upper part of the tank. Sub-tank 2b is provided with an underflow weir 4 open to the lower part of the tank. Weirs 3 and 4 are provided on the opposite sides of wall 1, and the two sub-tanks 2a and 2b are in communication with each other through passage 5 formed in the partition wall 1.

It has been known in the art, in order to be able to promote the constant temperature layer of this type of heat storage tank, that the velocity [v(m/sec)] of in-flow and out-flow of water of the sub-tanks 2a and 2b at the edges of the underflow and overflow weirs has to be set to meet the following condition: Field number Fr is $$FR = v/(d \cdot g \cdot \Delta\rho/\rho)^{\frac{1}{2}} \leq 1$$

where d is the distance (in m) of the upper edge of the overflow weir 3 from the water surface, which is equal to the distance of the lower edge of the underflow weir 4 from the bottom of the water tank, g is the gravitational acceleration, i.e., 9.8 (m/sec²), $\Delta\rho$ is the difference (in kg/m³) between the velocity of in-flow of water and the density of cold or hot water in the sub-tanks and $\rho$ is the density (in kg/m³) of cold or hot water.

In actual use of the heat storage device, however, the water level therein is always varying due to the control of the rate of flow of cold or hot water for recirculation according to the start and stop of a recirculating pump or variations of the air conditioning load. For this reason, it is likely that the above inequality fails to hold due to reduction of the value of d and/or increase of the velocity v, thus promoting the thermal diffusion due to mixing of water to reduce the energy of the cold or hot water so as to reduce the heat storage efficiency.

In addition, the overflow weir/underflow weir type heat storage tank is required to reduce the volume of the inner space of the overflow weir 3 and underflow weir 4 in order to reduce the zone where mixing of water and thermal diffusion take place. Further, the partition wall 1 is sometimes inevitably large, as in the case of FIG. 4, due to such cause as an underground beam footing. Furthermore, it is extremely difficult to make repairs in a zone surrounded by the overflow weir 3 and underflow weir 4, particularly a repair of waterproof layers.

SUMMARY OF THE INVENTION

A heat storage tank is disclosed which is divided by partition walls into a plurality of sub-tanks connected to one another in series. The heat storage tank is of an overflow weir/underflow weir type in which adjacent sub-tanks are in communication with each other by a passageway through the partition wall separating the adjacent sub-tanks. The passageway has one end open to an upper part of the space in one of the adjacent sub-tanks and the other end open to a lower part of the space in the other sub-tank at a predetermined depth position. A portion of the passageway is open to the upper part of the sub-tank space comprising a flexible passage member open to the upper sub-tank space with the open end suspended from a buoy floating on the water surface and with intake ports located a predetermined distance below the surface of the water.

OBJECTS OF THE INVENTION

An object of the present invention is to provide a heat storage tank in which water can flow steadily irrespective of variations of the water level and which ensures satisfactory constant temperature layer and heat storage efficiency.

Another object of the present invention is to provide a heat storage tank in which the body of the tank requires less direct construction work and the installation cost is low compared to the prior art "overflow weir-/underflow weir type" heat storage tank.

A further object of the present invention is to provide a heat storage tank which can ensure satisfactory constant temperature layer, which is subject to fewer problems, and which permits ready operation and maintenance.

The above-mentioned and other objects, features and advantages of the heat storage tank according to the present invention will become apparent from the following detailed description taken in conjunction with the drawings which indicate preferred embodiments of the invention.

DESCRIPTION OF THE PREFERRED EMBODIMENT

A preferred embodiment of the present invention will now be described, but it is to be understood that the embodiment has been chosen for illustrative purposes only, the range of the inventon being limited only by the scope of the appended claims.

Figure 1:
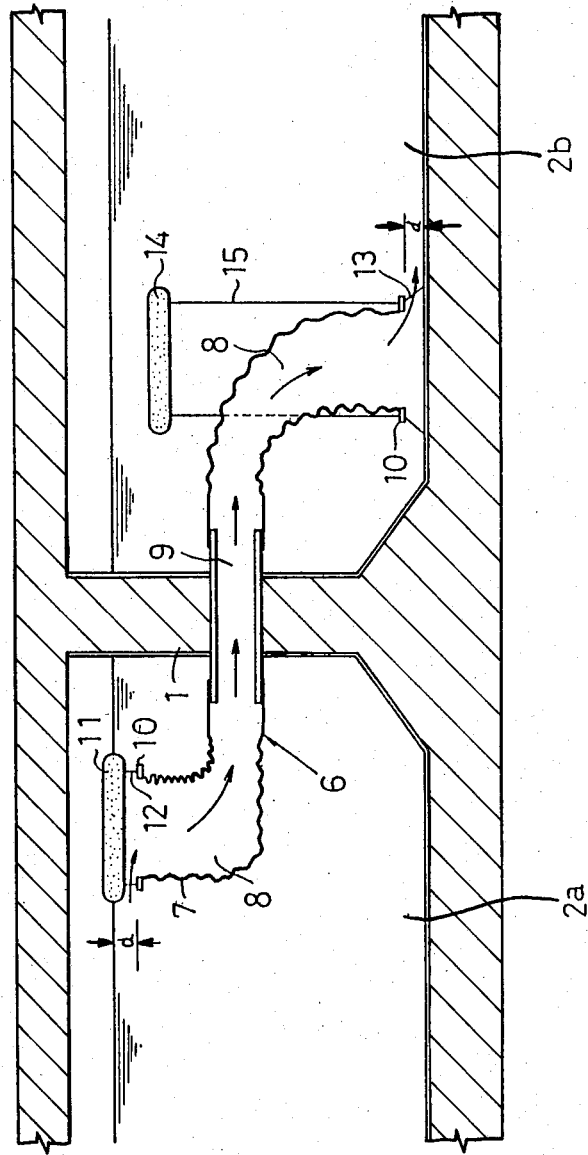
FIG. 1 is a fragmentary sectional view showing two sub-tanks on opposite sides of a partition wall and a passage in communication with the two sub-tanks in an embodiment of the heat storage device according to the present invention.

Referring to FIG. 1, there is shown a heat storage device which utilizes a double-bottom floor space in a reinforced concrete building structure. This heat storage device is divided by partition walls 1 which form a plurality of sub-tanks connected in series with one another. Sub-tanks 2a and 2b are in communication with each other by a communicating passageway 9 in wall 1. Passageway 9 is connected on opposite sides by conduit means 6 having an upper end positioned at the interface of air and water in sub-tank 2a and a lower end submersed beneath the surface of the water in sub-tank 2b.

The conduit means 6 consists of flexible passage members 8 disposed in the respective sub-tanks 2a and 2b and a coupling sleeve means in passageway 9 for connecting the two flexible passage members 8. Each of the flexible passage members 8 is formed with bellows-type, pleated reinforcement ribs 7.

The flexible passage member 8 provided in the sub-tank 2a is provided at the upper end with a reinforcement ring 10, as shown in FIG. 1, suspended from a buoy 11 floating on the water surface. Ring 10 is suspended from buoy 11 by connecting strands 12. The upper end of the flexible passage member 8 is thereby suspended at a fixed distance d from the water surface as determined by the lengths of strands 12. The other flexible passage member 8 in sub-tank 2b is also provided at its open end with a reinforcement ring 10 as shown in FIG. 1. Ring 10 is anchored to the bottom of sub-tank 2b by strands 13 and is suspended from the bottom of sub-tank 2b and upwardly urged by a buoy 14 restrained by strands 15. The reinforcement ring 10 is thus held at a fixed distance d from the bottom of the sub-tank 2b.

Figure 2:
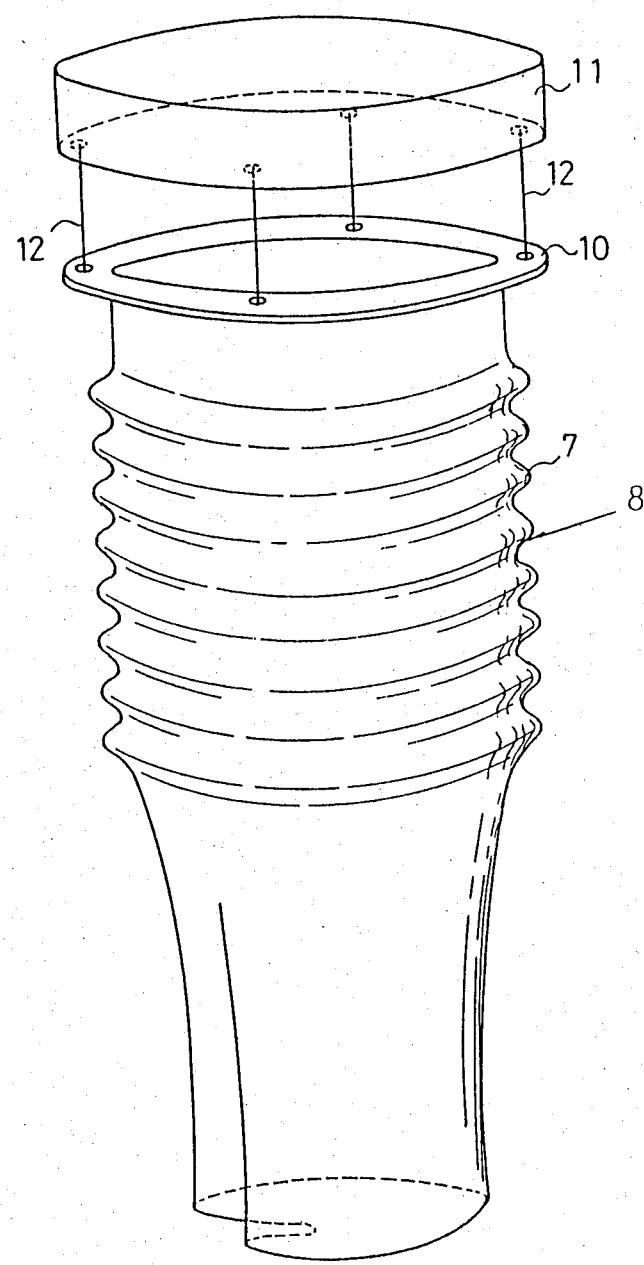
FIG. 2 is an elevational view in perspective of a flexible passage member open to an upper part of the sub-tank space.

FIG. 2 shows the flexible passage member 8. It is made of a flexible material such as a water-proof cloth or vinyl sheet. The ribs 7 prevent collapsing of members 8 in the event negative pressure should develop within member 8.

Figure 3:
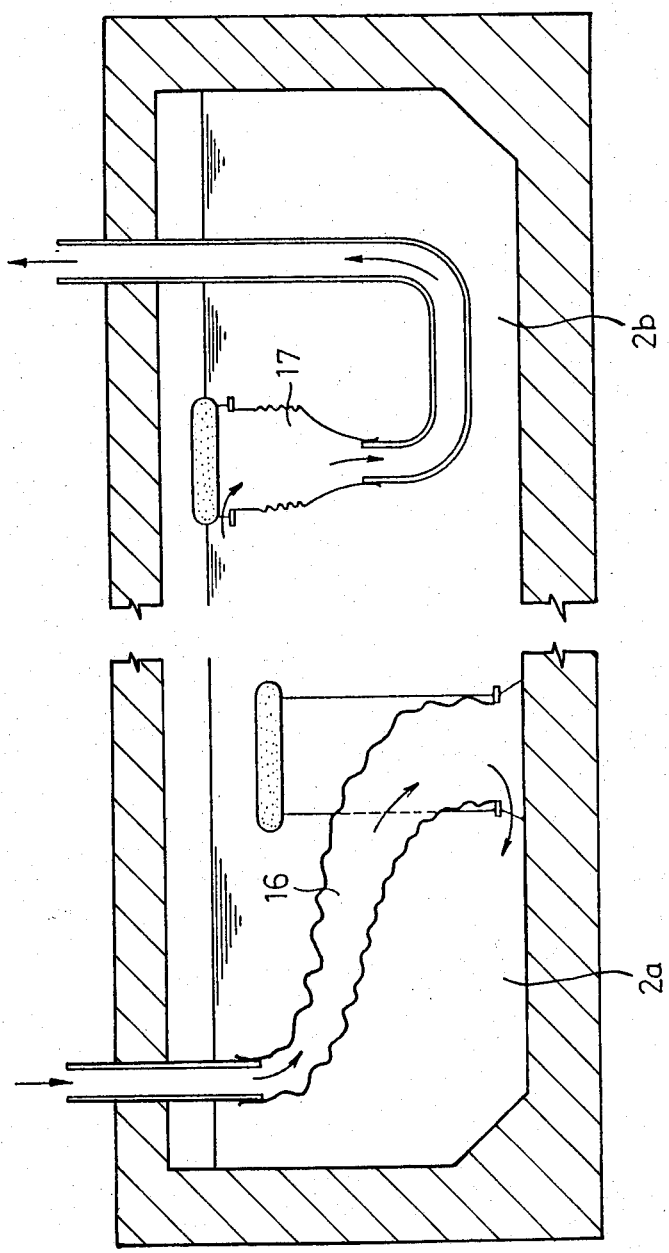
FIG. 3 is a fragmentary, elevational view in section, showing the heat storage device for explaining the state of in-flow of cold water from a freezer and state of withdrawal of warm water to the freezer.
Figure 4:
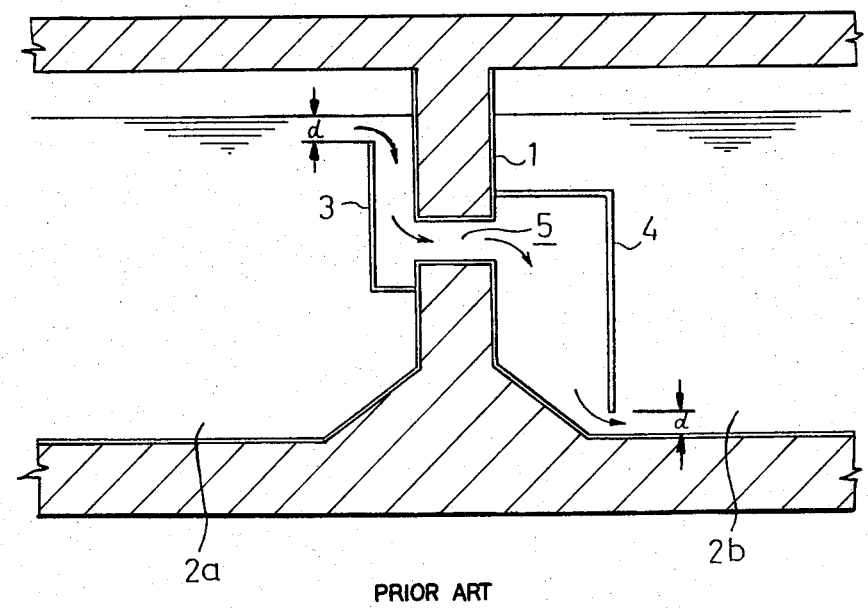
FIG. 4 is a fragmentary, elevational view in section showing a prior art overflow weir/underflow weir type heat storage device.

FIG. 3 illustrates means by which cold water is received directly from its source into sub-tank 2a by means of a flexible passage member having a passageway 16. Warm water is withdrawn from sub-tank 2b by means of a flexible passage member having a passageway 17. Arrows show the directions of flow of cold and warm water in passageways 16 and 17, respectively.

The invention will now be described in greater detail with reference to FIGS. 1 and 3. The sub-tank 2a has been filled with warm water that has been used for cooling. The warm water is progressively replaced with cold water that is supplied from the freezer through the passage 16 in FIG. 3 to the bottom portion of the water tank 2a in FIG. 1. The interface between the warm water and cold water thus is gradually elevated. When the interface reaches the ring 10 at the open end of the passage member 8, cold water will flow through the passage member 8 into the lower portion of the sub-tank 2b. In the sub-tank 2b, similar replacement of the warm water with the cold water takes place. It is apparent from a study of FIG. 3, sub-tank 2b, that the warmest water in the system illustrated in FIGS. 1 and 3 arrives in sub-tank 2b and is removed through passageway 17 for recirculation.

During this operation, the distance d in sub-tank 2a from the surface of the water to the top face of ring 10 remains constant irrespective of the water level. Thus, a preset fixed value is not exceeded at the velocity v, at which water flows in and out. The lower end of the passage member 8 in the sub-tank 2b (FIG. 1) from which water flows is also at a fixed distance from the bottom of the tank, so that the flow of water entering the sub-tank will not exceed a preset fixed value.

As aforesaid, in the above preferred embodiment of the invention, the lower end of the passage member 8 of sub-tank 2b (FIG. 1) has been anchored to the bottom of the tank by the strands 13 and also suspended from and upwardly urged by the submerged buoy 14 restrained by the strands 15. This arrangement, however, is by no means limitative, and it is possible, for instance, to provide support rods projecting from the bottom of the tank to secure the passage member 8 so that the open end of passage member 8 may be held at a predetermined distance from the bottom of the tank without the need for buoy 14 and strands 15.

As has been described in the foregoing, with the heat storage device which is divided by partition walls into a plurality of sub-tanks connected in series, the flow of water from one sub-tank to the next sub-tank will never exceed a predetermined velocity irrespective of variations of the water level in the tank. In addition, it is possible to minimize the capacity of the communication passage 9 so as to reduce the rate of thermal diffusion in the communication passage. Thus, thermal diffusion due to the mixing of water will be less likely to occur, so that a suitable condition for forming a constant temperature layer can be obtained to increase the heat storage efficiency. Further, the body of the heat storage device requires less direct construction work, the installation cost can be reduced, and the maintenance of the tank can be readily accomplished in a manner comparable to the prior art overflow weir/underflow weir type heat storage device.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In a liquid-filled heat storage device which is divided by partition walls into a plurality of sub-tanks connected to each other in series, the improvement comprising:
    adjacent pairs of said sub-tanks being communicated with each other by a communication passage penetrating the partition wall defining said adjacent sub-tanks, said communication passage having one end open to an upper part of the space in one of said adjacent sub-tanks and the other end open to a lower part of the space in the other sub-tank at a predetermined depth position;
    a buoy floating on the surface of said liquid in said one sub-tank;
    a portion of said communication passage including a flexible member with an open end suspended from said buoy positioned a predetermined constant distance beneath the surface of said liquid; and
    a portion of the communication passage including a flexible member with an open end anchored to the bottom of said other sub-tank and positioned a predetermined constant distance above said bottom.

* * * * *